United States Patent
Krug et al.

(10) Patent No.: US 11,418,233 B2
(45) Date of Patent: *Aug. 16, 2022

(54) METHODS AND APPARATUS TO MONITOR A MEDIA PRESENTATION

(71) Applicant: The Nielsen Company (US), LLC, New York, NY (US)

(72) Inventors: William K. Krug, Rockville, MD (US); James Zhang, Vineland, NJ (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/902,061

(22) Filed: Jun. 15, 2020

(65) Prior Publication Data

US 2020/0382164 A1 Dec. 3, 2020

Related U.S. Application Data

(63) Continuation of application No. 16/208,497, filed on Dec. 3, 2018, now Pat. No. 10,715,214, which is a
(Continued)

(51) Int. Cl.
*G06F 17/00* (2019.01)
*H04B 5/00* (2006.01)
(Continued)

(52) U.S. Cl.
CPC .......... *H04B 5/0006* (2013.01); *G06F 3/165* (2013.01); *H04B 5/06* (2013.01); *H04L 65/403* (2013.01);
(Continued)

(58) Field of Classification Search
CPC ......... H04B 5/0006; H04B 5/06; H04W 4/70; G06F 3/165; H04L 65/403; H04R 3/005;
(Continued)

(56) References Cited

U.S. PATENT DOCUMENTS 2,662,168 A 12/1953 Scherbatskoy
3,919,479 A 11/1975 Moon et al.
(Continued)

FOREIGN PATENT DOCUMENTS

AU 2008347051 7/2009
EP 0887958 1/2003
(Continued)

OTHER PUBLICATIONS

European Patent Office, "Search Report," issued in connection with European Patent Application No. 20163604.0, dated Jun. 2, 2020, 7 pages.
(Continued)

*Primary Examiner* — Paul C McCord
(74) *Attorney, Agent, or Firm* — Hanley, Flight & Zimmerman, LLC

(57) ABSTRACT

Methods and apparatus to monitor a media presentation are disclosed. An example system includes a monitoring device to monitor a media presentation and generate research data identifying the media. A bridge device includes a housing dimensioned to receive the monitoring device, a receiver carried by the housing to receive a first audio signal via a wireless data connection from an audio source device using a wireless communication protocol, the first audio signal associated with the media. The bridge device includes an audio emitter to emit the audio signal for receipt by the monitoring device, and a transmitter to transmit the audio signal to an audio receiver device using the wireless communication protocol.

20 Claims, 7 Drawing Sheets

Related U.S. Application Data continuation of application No. 15/477,711, filed on Apr. 3, 2017, now Pat. No. 10,148,317, which is a continuation of application No. 14/577,888, filed on Dec. 19, 2014, now Pat. No. 9,614,881, which is a continuation of application No. 12/006,452, filed on Dec. 31, 2007, now Pat. No. 8,930,003.

(51) Int. Cl.
| | |
|---|---|
| *H04B 5/06* | (2006.01) |
| *H04W 4/70* | (2018.01) |
| *H04R 29/00* | (2006.01) |
| *G06F 3/16* | (2006.01) |
| *H04L 65/403* | (2022.01) |
| *H04R 3/00* | (2006.01) |
| *H04R 5/04* | (2006.01) |
| *G11B 20/10* | (2006.01) |

(52) U.S. Cl.
CPC .............. *H04R 3/005* (2013.01); *H04R 5/04* (2013.01); *H04R 29/00* (2013.01); *H04W 4/70* (2018.02); *G11B 2020/10546* (2013.01); *H04R 2201/107* (2013.01); *H04R 2420/07* (2013.01); *H04R 2420/09* (2013.01); *H04R 2499/11* (2013.01)

(58) Field of Classification Search
CPC .... H04R 5/04; H04R 29/00; H04R 2201/107; H04R 2420/07; H04R 2420/09; H04R 2499/11; G11B 2020/10546
USPC ........................................................ 700/94
See application file for complete search history.

(56) References Cited

U.S. PATENT DOCUMENTS

| | | | |
|---|---|---|---|
| 4,230,990 | A | 10/1980 | Lert, Jr. et al. |
| 4,450,551 | A | 5/1984 | Kudo et al. |
| 4,677,466 | A | 6/1987 | Lert, Jr. et al. |
| 4,697,209 | A | 9/1987 | Kiewit et al. |
| 4,739,398 | A | 4/1988 | Thomas et al. |
| 4,843,562 | A | 6/1989 | Kenyon et al. |
| 4,918,730 | A | 4/1990 | Schulze |
| 4,955,070 | A | 9/1990 | Welsh et al. |
| 5,319,735 | A | 6/1994 | Preuss et al. |
| 5,450,490 | A | 9/1995 | Jensen et al. |
| 5,512,933 | A | 4/1996 | Wheatley et al. |
| 5,574,962 | A | 11/1996 | Fardeau et al. |
| 5,579,124 | A | 11/1996 | Aijala et al. |
| 5,581,800 | A | 12/1996 | Fardeau et al. |
| 5,594,934 | A | 1/1997 | Lu et al. |
| 5,612,729 | A | 3/1997 | Ellis et al. |
| 5,687,191 | A | 11/1997 | Lee et al. |
| 5,737,025 | A | 4/1998 | Dougherty et al. |
| 5,764,763 | A | 6/1998 | Jensen et al. |
| 5,787,334 | A | 7/1998 | Fardeau et al. |
| 5,828,325 | A | 10/1998 | Wolosewicz et al. |
| 5,945,932 | A | 8/1999 | Smith et al. |
| 6,154,484 | A | 11/2000 | Lee et al. |
| 6,175,627 | B1 | 1/2001 | Petrovic et al. |
| 6,539,358 | B1 | 3/2003 | Coon et al. |
| 6,621,881 | B2 | 9/2003 | Srinivasan |
| 6,845,360 | B2 | 1/2005 | Jensen et al. |
| 6,862,355 | B2 | 3/2005 | Kolessar et al. |
| 6,871,180 | B1 | 3/2005 | Neuhauser et al. |
| 7,222,071 | B2 * | 5/2007 | Neuhauser ............ H04H 60/37 704/231 |
| 7,324,824 | B2 | 1/2008 | Smith et al. |
| RE42,627 | E | 8/2011 | Neuhauser et al. |
| 8,019,449 | B2 | 9/2011 | Barzegar et al. |
| 8,027,282 | B2 | 9/2011 | Boehnke et al. |
| 8,116,401 | B2 | 2/2012 | Ibrahim et al. |
| 8,295,766 | B2 | 10/2012 | Zimbric et al. |
| 8,335,576 | B1 | 12/2012 | Bradshaw et al. |
| 8,930,003 | B2 * | 1/2015 | Krug ..................... H04R 29/00 700/94 |
| 9,614,881 | B2 * | 4/2017 | Krug ...................... G06F 3/165 |
| 10,148,317 | B2 * | 12/2018 | Krug ...................... G06F 3/165 |
| 10,715,214 | B2 * | 7/2020 | Krug ...................... H04R 5/04 |
| 2001/0003166 | A1 | 6/2001 | Gulick |
| 2001/0053190 | A1 | 12/2001 | Srinivasan |
| 2003/0005430 | A1 | 1/2003 | Kolessar |
| 2003/0061490 | A1 | 3/2003 | Abajian |
| 2003/0110485 | A1 | 6/2003 | Lu et al. |
| 2003/0229900 | A1 | 12/2003 | Reisman |
| 2004/0064319 | A1 | 4/2004 | Neuhauser et al. |
| 2004/0230332 | A1 | 11/2004 | Cheng |
| 2005/0054285 | A1 | 3/2005 | Mears et al. |
| 2005/0144632 | A1 | 6/2005 | Mears et al. |
| 2005/0267750 | A1 | 12/2005 | Steuer et al. |
| 2006/0195861 | A1 | 8/2006 | Lee |
| 2006/0269004 | A1 | 11/2006 | Ibrahim et al. |
| 2007/0115827 | A1 | 5/2007 | Boehnke et al. |
| 2007/0142024 | A1 | 6/2007 | Clayton et al. |
| 2007/0155430 | A1 * | 7/2007 | Cheon ................. H04M 1/0254 455/558 |
| 2007/0259621 | A1 | 11/2007 | Lin et al. |
| 2007/0260682 | A1 | 11/2007 | Guccione |
| 2008/0049704 | A1 | 2/2008 | Witteman et al. |
| 2008/0263579 | A1 | 10/2008 | Mears et al. |
| 2009/0034750 | A1 | 2/2009 | Ayoub et al. |
| 2009/0061769 | A1 | 3/2009 | Zimbric et al. |
| 2009/0068949 | A1 | 3/2009 | Lin |
| 2009/0169024 | A1 | 7/2009 | Krug et al. |
| 2015/0112466 | A1 | 4/2015 | Krug et al. |

FOREIGN PATENT DOCUMENTS

| | | |
|---|---|---|
| EP | 2227865 | 9/2010 |
| WO | 9111062 | 7/1991 |
| WO | 2005038625 | 4/2005 |
| WO | 2005041109 | 5/2005 |
| WO | 2006014362 | 2/2006 |
| WO | 2009088485 | 7/2009 |

OTHER PUBLICATIONS

European Patent Office, "European Search Patent Office," issued in connection with European Patent Application No. 20163604.0, dated Jun. 2, 2020, 7 pages.

European Patent Office, "European Patent Office," issued in connection with European Patent Application No. 20163604.0, dated May 29, 2020, 9 pages.

Goss et al., "Speclral Retrieval By Fuzzy Matching," Analytical Proceedings Including Analytical Communications, vol. 31, Jan. 1994, 3 pages.

United States Patent and Trademark Office, "Non-Fnal Office Action," issued in connection with U.S. Appl. No. 16/208,497, dated Oct. 23, 2019, 14 pages.

United States Patent and Trademark Office, "Notice of Allowance," issued in connection with U.S. Appl. No. 16/208,497, dated Feb. 12, 2020, 7 pages.

European Patent Office, "First Examination Report," issued in connection with European Patent Application No. 08870324.4 dated Apr. 26, 2018, 11 pages.

Apple Inc., "AirPort Express", [www.apple.com/airport], 2007, 56 pages.

Bender et al.,"Techniques for Data Hiding," IBM Systems Journal, 1996, vol. 35, Nos. 3 4, 24 pages.

Canadian Intellectual Property Office, "Office Action," issued in connection with Canadian Patent Application No. 2,710,836, dated Jul. 14, 2015, 4 pages.

Canadian Intellectual Property Office, "Notice of Allowance," issued in connection with Canadian Patent Application No. 2,710,836, dated Oct. 18, 2016, 1 page.

European Patent Office, "Communication Pursuant to Article 94(3) EPC," issued in connection with European Application No. 10008093.6 dated Aug. 17, 2016, 8 pages.

(56) References Cited

OTHER PUBLICATIONS

IP Australia, "Examination Report No. 1," issued in connection with corresponding Australian Patent Application No. 2008347051, dated Oct. 31, 2012, 3 pages.

IP Australia, "Notice of Acceptance", issued in connection with corresponding Australian Patent Application No. 2008347051, dated Jan. 7, 2013, 1 page.

International Searching Authority "International Search Report and Written Opinion", issued in connection with corresponding International Patent Application No. PCT/US2008/014142, dated Mar. 3, 2009, 9 pages.

R. Walker, "Audio Watermarking," BBC Research and Development, Aug. 2004, 17 pages.

United States Patent and Trademark Office, "Non-Final Office Action," issued in connection with U.S. Appl. No. 12/006,452, dated Jul. 12, 2011, 6 pages.

United States Patent and Trademark Office, "Non-Final Office Action," issued in connection with U.S. Appl. No. 12/006,452, dated Nov. 18, 2011, 12 pages.

United States Patent and Trademark Office, "Final Office Action," issued in connection with U.S. Appl. No. 12/006,452, dated Apr. 26, 2012, 14 pages.

United States Patent and Trademark Office, "Advisory Action," issued in connection with U.S. Appl. No. 12/006,452, dated Aug. 3, 2012, 3 pages.

United States Patent and Trademark Office, "Non-Final Office Action," issued in connection with U.S. Appl. No. 12/006,452, dated Oct. 28, 2013, 13 pages.

United States Patent and Trademark Office, "Notice of Allowance," issued in connection with U.S. Appl. No. 12/006,452, dated Apr. 17, 2014, 17 pages.

United States Patent and Trademark Office, "Notice of Allowance," issued in connection with U.S. Appl. No. 14/577,888, dated Dec. 6, 2016, 6 pages.

United States Patent and Trademark Office, "Notice of Allowance," issued in connection with U.S. Appl. No. 12/006,452, dated Sep. 5, 2014, 5 pages.

United States Patent and Trademark Office, "Notice of Allowance," issued in connection with U.S. Appl. No. 14/577,888, dated Jun. 23, 2016, 8 pages.

United States Patent and Trademark Office, "Notice of Allowance," issued in connection with U.S. Appl. No. 15/477,711, dated Jul. 27, 2018, 8 pages.

\* cited by examiner

METHODS AND APPARATUS TO MONITOR A MEDIA PRESENTATION

RELATED APPLICATION

This patent arises from a continuation of U.S. patent application Ser. No. 16/208,497, filed on Dec. 3, 2018, and entitled "METHODS AND APPARATUS TO MONITOR A MEDIA PRESENTATION", which is a continuation of U.S. patent application Ser. No. 15/477,711, filed on Apr. 3, 2017, and entitled "METHODS AND APPARATUS TO MONITOR A MEDIA PRESENTATION", which is a continuation of U.S. patent application Ser. No. 14/577,888, filed on Dec. 19, 2014, and entitled "METHODS AND APPARATUS TO MONITOR A MEDIA PRESENTATION", which is a continuation of U.S. patent application Ser. No. 12/006,452, filed on Dec. 31, 2007, and entitled "DATA CAPTURE BRIDGE". Priority to U.S. patent application Ser. No. 16/208,497, U.S. patent application Ser. No. 15/477,711, U.S. patent application Ser. No. 14/577,888, and U.S. patent application Ser. No. 12/006,452 is hereby claimed. U.S. patent application Ser. No. 16/208,497, U.S. patent application Ser. No. 15/477,711, U.S. patent application Ser. No. 14/577,888, and U.S. patent application Ser. No. 12/006,452 are hereby incorporated herein by reference in their entireties.

BACKGROUND

Efforts to monitor the exposure of consumers to audio and video media such as, e.g., programs, music, and advertisements, have long relied on gathering data from audience survey participants. Traditionally, such data gathering has involved the manual recording of media content consumption patterns by survey participants in participant diaries. Audience surveys have been conducted by providing selected and consenting members with record diaries and requiring that the audience members record their media consumption periodically over a particular time span. Unfortunately, survey participants often prove unreliable in their ability to maintain complete and accurate records of their media consumption activities. Record diaries may be forgotten or lost, and, even when remembered, significant discipline is required to maintain accurate written records on a regular basis. The metric of survey participant adherence to the data collection protocol of a survey is termed "compliance." More recently, the development of miniaturized electronic technologies has permitted the automation of some data collection functions useful in the study of audience media consumption. Compliance is generally improved by this automation of data collection.

Many consumer electronic devices are now enabled to provide personal area network wireless connectivity with other devices over short distances. Bluetooth is a particularly popular short-range wireless technology that allows electronic devices to communicate with one another wirelessly, i.e., without connectors, wires, or cables. Bluetooth enabled headsets and vehicle speaker systems are now widely used with cellular phones and media players to wirelessly receive audio signals and to produce an audio output heard by the user.

Capturing complete and accurate information regarding consumer media consumption using Bluetooth or other wireless personal area network enabled devices in a convenient and effective manner remains difficult. Despite the ongoing efforts of many creative practitioners of skill in the art, this problem has remained unsolved until now.

SUMMARY

In accordance with certain embodiments of the invention, an apparatus is provided for gathering research data indicating exposure to audio content to a user of an audio source device and an audio receiver device. The audio source device wirelessly transmits an audio signal containing the audio content. The audio receiver device receives an audio signal containing the audio content. The audio receiver device includes a speaker to output the audio content to be heard by the user. The apparatus includes a bridge device for wirelessly bridging the audio signal from the audio source device to the audio receiver device. The bridge device includes a speaker for outputting the audio content from the audio signal. The apparatus also includes a monitoring device acoustically coupled to the bridge device for monitoring the audio content output by the speaker of the bridge device, and generating research data identifying the audio content.

In accordance with certain embodiments of the invention, a method is provided for gathering research data indicating exposure to audio content to a user of an audio source device and an audio receiver device. The audio source device wirelessly transmits an audio signal containing the audio content. The audio receiver device receives an audio signal containing the audio content and uses a speaker to output the audio content to be heard by the user. The method comprises: (a) wirelessly bridging the audio signal from the audio source device to the audio receiver device; (b) outputting the audio content from the audio signal; and (c) monitoring the audio content output in (b) and generating research data identifying the audio content.

In accordance with certain embodiments of the invention, a system is provided for gathering research data indicating exposure to audio content to a user. The system includes an audio source device for wirelessly transmitting an audio signal containing the audio content. The system also includes an audio receiver device including a speaker for outputting the audio content to be heard by the user. The system further includes a bridge device for wirelessly bridging the audio signal from the audio source device to the audio receiver device. The bridge device includes a speaker for outputting the audio content from the audio signal. The system also includes a monitoring device acoustically coupled to the bridge device for monitoring the audio content output by the speaker of the bridge device and generating research data identifying the audio content.

These and other advantages and features of the invention will be more readily understood in relation to the following detailed description of the invention, which is provided in conjunction with the accompanying drawings.

DETAILED DESCRIPTION

Figure 1:
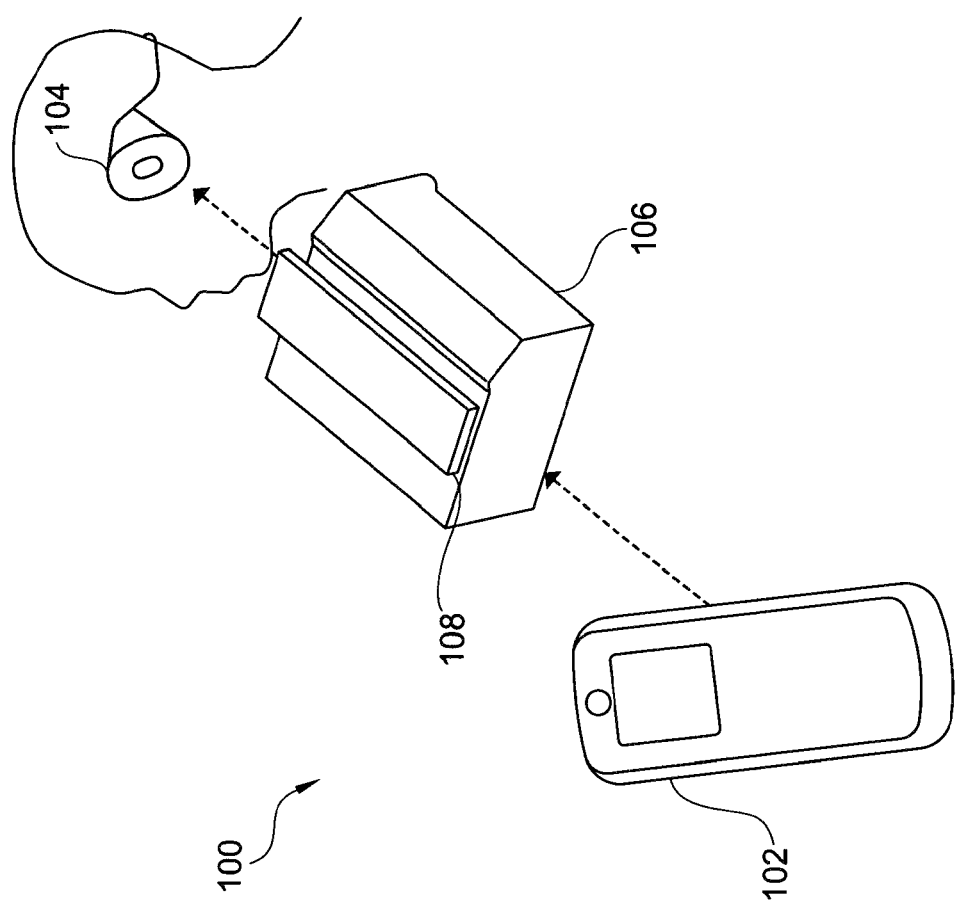
FIG. 1 is an illustration of an exemplary research data collection system in accordance with certain embodiments of the invention.

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In certain instances, well-known structures and devices are shown in block diagram form in order to avoid unnecessarily obscuring the present inventions.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data that is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, files, broadcasts, displays (including but not limited to video displays, posters and billboards), signs, signals, web pages, print media and streaming media data.

The term "research data" as used herein means data comprising (1) data concerning usage of media, (2) data concerning exposure to media, and/or (3) market research data.

The terms "gather" and "gathering" as used herein include both directly gathering data with the use of a device as well as emitting data from a device that causes or enables another device to gather data.

The term "research operation" as used herein means an operation comprising gathering, storing and/or communicating research data.

The term "network" as used herein includes both networks and internetworks of all kinds, including the Internet, and is not limited to any particular network or internetwork.

The terms "first," "second," "primary," and "secondary" are used herein to distinguish one element, set, data, object, step, process, function, action or thing from another, and are not used to designate relative position, arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate", and "communicating" as used herein include both conveying data from a source to a destination, and delivering data to a communications medium, system, channel, device, wire, cable, fiber, circuit, or link to be conveyed to a destination, and the term "communication" as used herein means data so conveyed or delivered. The term "communications' as used herein includes one or more of a communications medium, system, channel, device, wire, cable, fiber, circuit, and link.

The term "processor" as used herein means processing devices, apparatus, programs, circuits, components, systems, and subsystems, whether implemented in hardware, software, or both, and whether or not programmable. The term "processor" as used herein includes, but is not limited to computers, hardwired circuits, signal modifying devices and systems, devices and machines for controlling systems, central processing units, programmable devices, field programmable gate arrays, application specific integrated circuits, systems on a chip, systems comprised of discrete elements and circuits, state machines, virtual machines, and combinations of any of the foregoing.

The terms "storage" and "data storage" as used herein mean data storage devices, apparatus, programs, circuits, components, systems, subsystems, and storage media serving to retain data, whether on a temporary or permanent basis, and to provide such retained data.

The present application relates to methods and apparatus for gathering research data by identifying audio content (such as, e.g., programs, music, and advertisements) to which a user of a Bluetooth or other wireless personal area network enabled audio source device is exposed. Numerous types of research operations are possible, including, without limitation, television and radio program audience measurement; exposure to advertising in various media such as television and radio; and exposure to downloaded audio and video recordings such as podcasts. For the desired type of media and/or market research operation to be conducted, particular activity of individuals is monitored, or data concerning their attitudes, awareness, and/or preferences is gathered. In certain embodiments, research data relating to two or more of the foregoing are gathered, while in others only one kind of such data is gathered.

Monitoring devices have been developed including the hardware and software required to Monitor exposure to audio media. In the course of developing the present invention, the inventors have understood the limitations of such existing Monitoring devices including the inability of existing devices to effectively capture information related to signals received at a Bluetooth earpiece. The inventors have understood that this processes may particularly difficult by the peer-to-peer parent that exists in the Bluetooth communication protocol. Although Bluetooth communications have been in existence for some time, the problems understood and identified by the inventors have remained unresolved. Through diligent effort the inventors have developed a superior method and apparatus for conducting the desired information capture.

FIG. 1 illustrates an exemplary system 100 for gathering research data indicating exposure to audio content by a user in accordance with one or more embodiments of the invention. The system 100 includes an audio source device 102 to provide audio content to a user such as, e.g., a cellular telephone, a portable media player (e.g., an iPod® device), a personal digital assistant ("PDA"), a smartphone (e.g., Blackberry® device), a radio, a television, a game system (e.g., a Gameboy® device), a notebook or laptop or other computer, a GPS device, a DVD player, and a walkie talkie.

The system 100 also includes an audio receiver device 104 such as, e.g., a wireless headset, wireless earphones, or speaker system such as a vehicle speaker system. The audio source device 102 and the audio receiver device 104 are enabled to provide Bluetooth or other personal area network wireless connectivity such that in ordinary use, the audio receiver device 104 receives wireless audio streaming containing audio content from the audio source device and outputs the audio content to be heard by the user.

The system 100 further includes a bridge device 106 for diverting and bridging the audio stream transmitted by the audio source device 102 to the audio receiver device 104. Thus, unlike the ordinary use of the audio source device 102 and the audio receiver device 104 in which the audio source device 102 transmits an audio stream directly to the audio receiver device 104, in accordance with various embodiments of the invention, the audio stream from the audio source device 102 is sent to the bridge device 106, which in turn sends the audio stream to the audio receiver device 104.

The system 100 also includes a monitoring device 108 (sometimes referred to as a "portable people meter"), which is acoustically coupled to the bridge device 106, for generating research data identifying the audio content to which the user is exposed.

Figure 2:
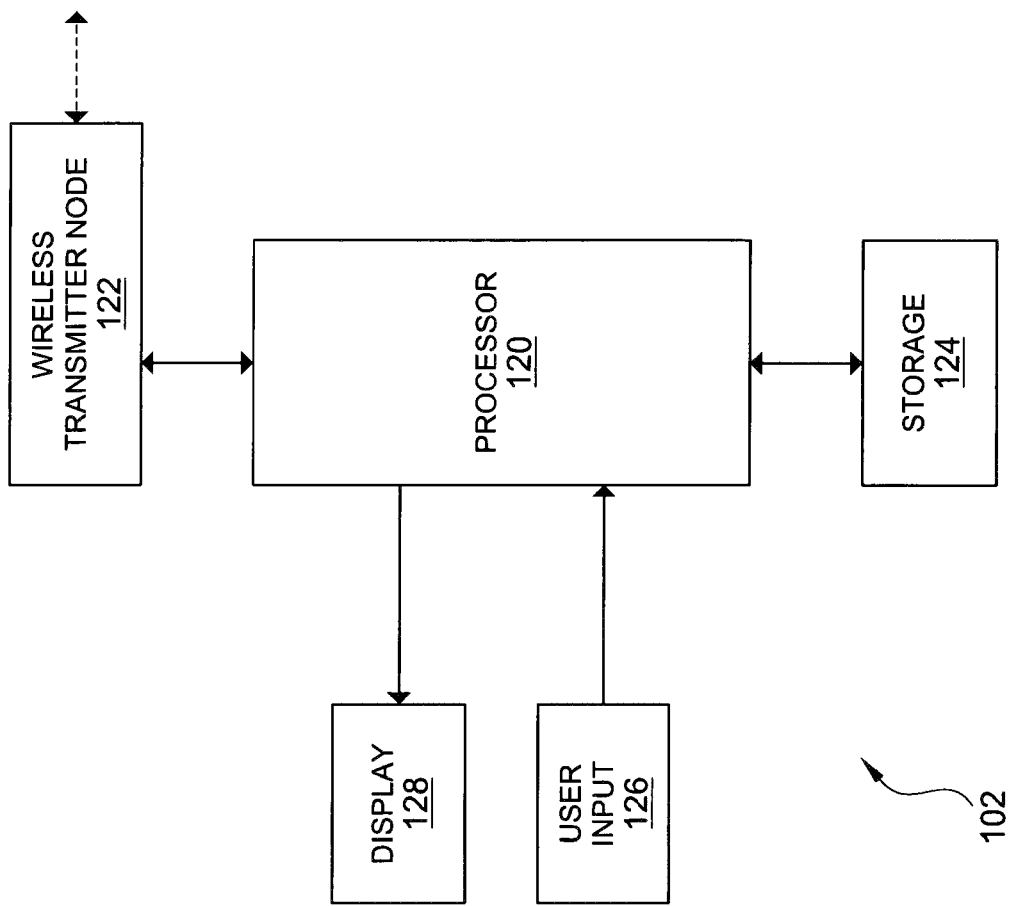
FIG. 2 is a block diagram of an exemplary audio source device.

FIG. 2 is a block diagram illustrating an exemplary audio source device 102. The audio source device 102 can include a processor 120 that is operative to exercise overall control and to process audio and other data for transmission or reception. The audio source device 102 includes a wireless transmitter node 122 (such as a Bluetooth transmitter node) coupled to the processor 120 to wirelessly transmit audio signals containing audio content. In other embodiments, the audio source device 102 does not include a wireless transmitter node, in which case, a wireless transmitter node is provided in a separate device attached to the audio source device 102. The wireless transmitter node 122 includes a transceiver configured to allow the audio source device 102 to communicate with another device using a wireless protocol such as, e.g., Bluetooth protocol, ZigBee™ protocol, wireless LAN protocol, or via an infrared data link, inductive link or the like, for enabling communications with the bridge device 106 as will be described below.

In some audio source devices 102, the processor 120 can also execute other applications such as, e.g., applications serving to download audio and/or video data, e-mail clients and applications enabling the user to play games using the audio source device 102.

The audio source device 102 can also include storage 124 coupled with processor 120 and operative to store data such as, e.g., audio content, and application programs. In certain embodiments, storage 124 stores software providing audio and/or video downloading and reproducing functionality, such as iPod® software, enabling the user to reproduce audio and/or video content downloaded from a source, such as a personal computer.

In addition, audio source device 102 can also include a user input interface 126 coupled with processor, such as a keypad, to enter telephone numbers and other control data. The audio source device 102 can also include a display 128 coupled with processor 120 to provide data visually to the user under the control of processor 120.

Figure 3:
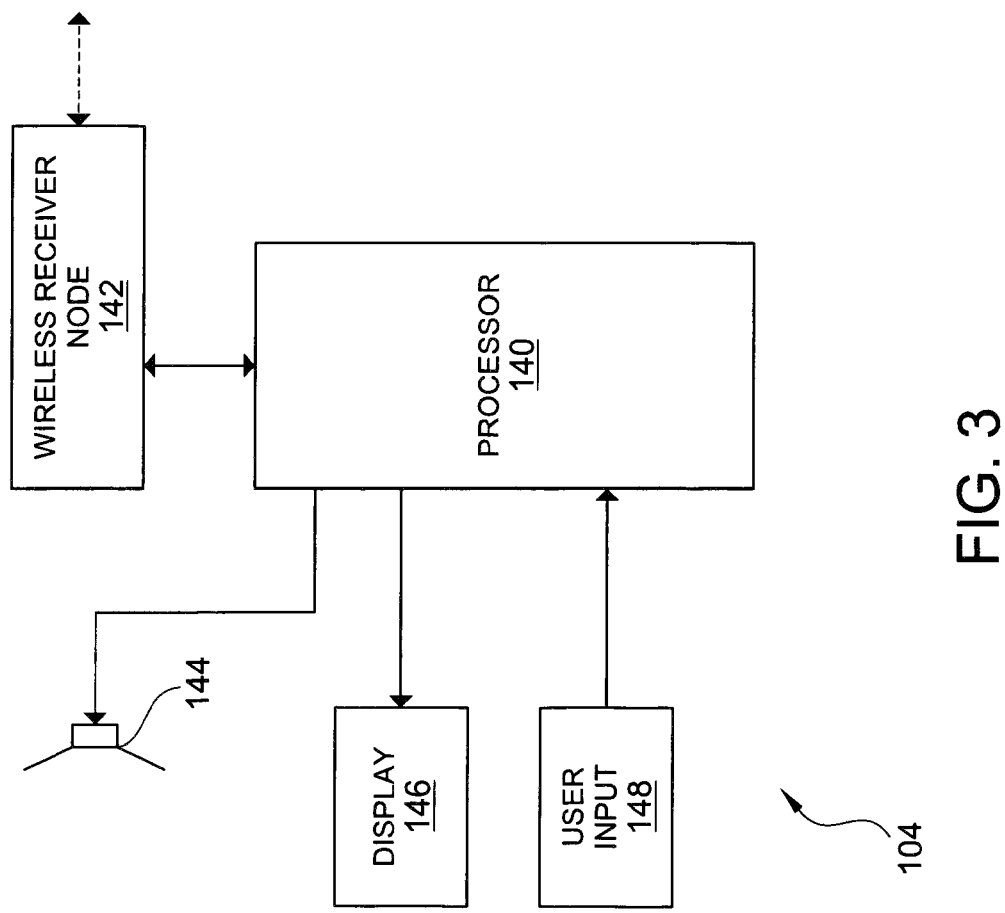
FIG. 3 is a block diagram of an exemplary audio receiver device.

FIG. 3 is a block diagram of an exemplary audio receiver device 104, which can be any Bluetooth or other personal area network enabled device that produces an acoustic output to be heard by the user from received wireless audio signals. As indicated above, audio receiver devices 104 can include, without limitation, wireless headsets, earphones, and speaker systems. The audio receiver device 104 includes a processor 140 that is operative to exercise overall control and to process audio and other data received by the device. The device 104 also includes a wireless receiver node 142 coupled to the processor 140 to receive wireless audio signals containing audio content. The audio receiver device 104 also includes one or more speakers or earphones 144 coupled with processor 140 to transduce received audio signals from processor 140 to an acoustic output to be heard by the user. The audio receiver device 104 also includes a user input interface 148 (such as control buttons for entering data and user commands) coupled with the processor 140, and a display 146 or indicator coupled with the processor device to indicate, e.g., operational status of the device.

Figure 4A:
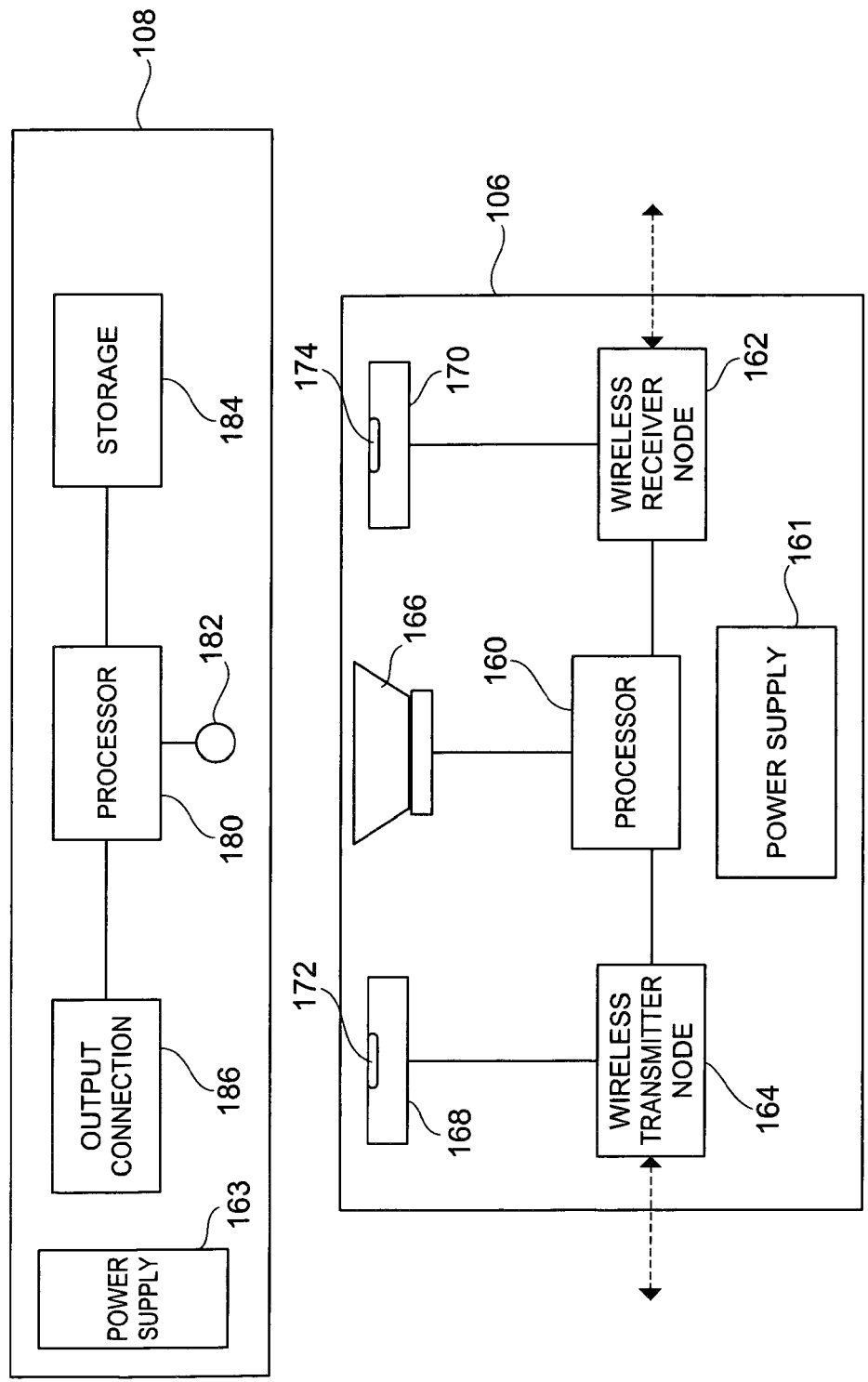
FIG. 4A is a block diagram of a bridge device and a monitoring device in accordance with certain embodiments of the invention.

FIG. 4A is a block diagram illustrating an exemplary bridge device 106 and an exemplary monitoring device 108 in accordance with certain embodiments of the invention. The bridge device 106 includes a processor 160 that is operative to exercise overall control and to process audio data for transmission and reception. The bridge device 106 bridges wireless audio signals received from the audio source device 102 to the audio receiver device 104. For this purpose, the bridge device 106 includes a wireless receiver node 162 (such as a Bluetooth receiver node) coupled to the processor 160 that wirelessly receives audio signals containing audio content from the audio source device 102, and a wireless transmitter node 164 (such as a Bluetooth transmitter node) coupled to the processor 160 that wirelessly transmits outgoing audio signals containing audio content received from the audio source device 102. The wireless receiver and transmitter nodes 162, 164 of the bridge device 106 each include a transceiver configured to allow the bridge device 106 to communicate with the audio source device 102 and the audio receiver device 104, respectively, using a wireless protocol such as, e.g., Bluetooth protocol, ZigBee™ protocol, wireless LAN protocol, or via an infrared data link, inductive link or the like.

According to certain embodiments of the invention, power supplies 161, 163 are shown in the exemplary bridge device 106 and in the exemplary monitoring device 108 respectively. In various embodiments, these power supplies include, for example, one or more of a disposable electrochemical battery, a rechargeable electrochemical battery, a fuel cell, a capacitive power storage device, a miniature heat engine such as a micro-electro-mechanical system (MEMS) turbine, a miniature generator such as a hand-crank generator, and a electromagnetic energy capture device such as a photovoltaic device, among others known in the art.

In certain embodiments, the wireless receiver node 162 of the bridge device 106 outputs a demodulated audio baseband signal to the processor 160 from the wireless audio signal received from the audio source device 102. The processor 160 transmits the demodulated audio baseband signal to the wireless transmitter module 164, which re-modulates the signal for wireless transmission to the audio receiver device 104.

The processor 160 also transmits the demodulated audio baseband signal to a speaker 166, which transduces the signal to an acoustic output. The acoustic output is received by the monitoring device 108 and used to generate research data identifying the audio content as will be described below.

Figure 4B:
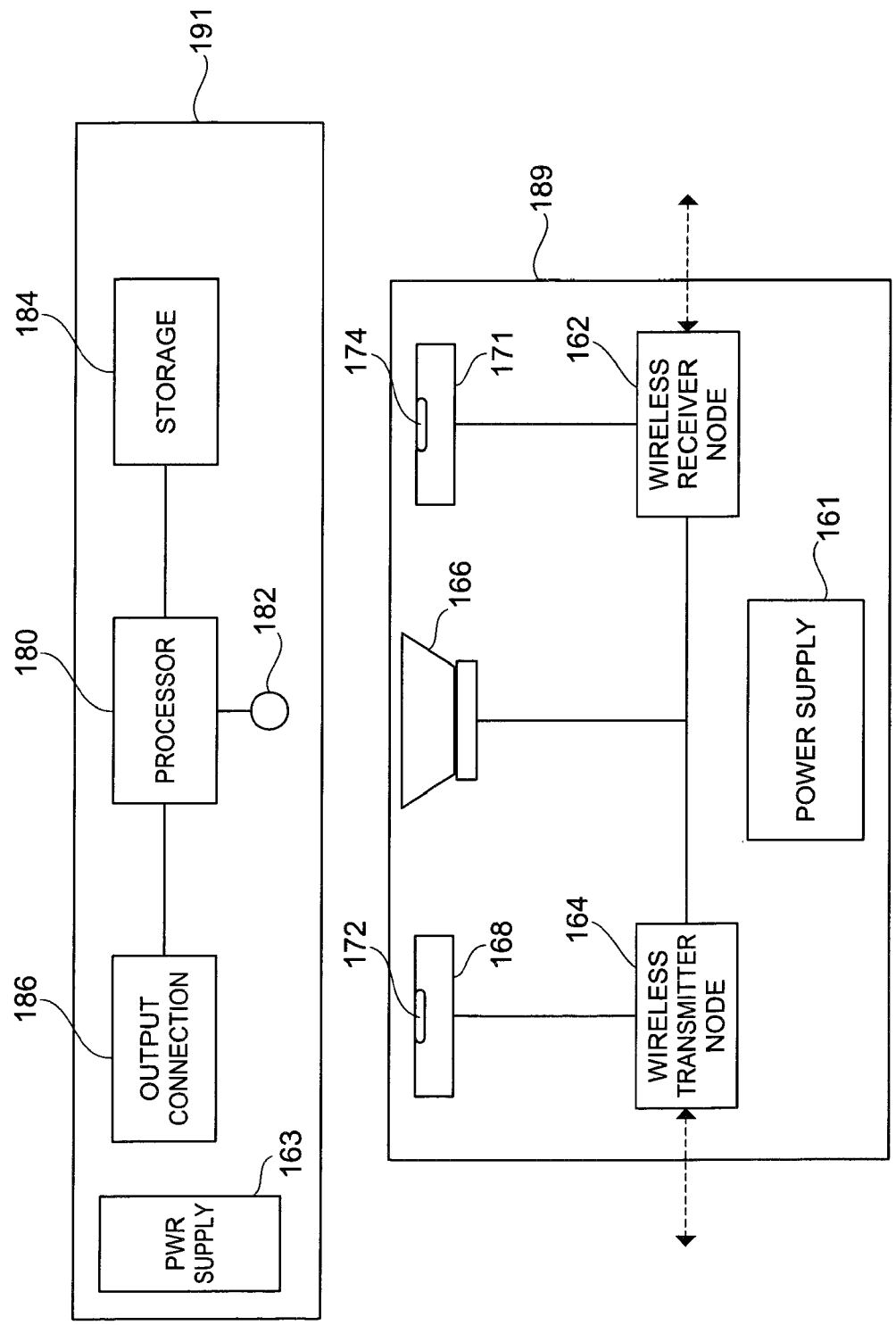
FIG. 4B is a block diagram of a bridge device and a monitoring device in accordance with certain further embodiments of the invention.

In certain embodiments, no processor (such as processor 160) is present between the receiver node 162 and the transmitter node 164 such that the audio baseband signal from the receiver node 162 is transmitted to the transmitter node 164 without passing through a processor. The audio baseband signal output by the receiver node is also distributed to the speaker 166. Accordingly, FIG. 4B shows exemplary monitoring device 191 in accordance with certain embodiment of the invention. The bridge device 189 includes a wireless receiver node 167 such as a Bluetooth receiver node mutually coupled to a wireless transmitter node 165 and to a speaker 166. In one embodiment, the speaker 166 includes a driver (i.e. an amplifier) device.

The bridge device 106 also includes a user input coupled with processor 160, such as control buttons 168, 170 each associated with one of the nodes 162, 164 to input user commands to "pair" the device 106 to the audio source device 102 and to the audio receiver device 104 as will be described below. The bridge device 106 also includes one or more indicators 172, 174 (such as LED indicators) coupled with processor 160 to indicate pairing with other devices. In certain embodiments, the control button and indicator for each node are integrated in a single button/indicator.

In certain embodiments, processor 160 comprises two or more processing devices, such as a first processing device (such as a digital signal processor) that processes audio, and a second processing device that exercises overall control over operation of the bridge device 106. In certain embodiments, processor employs a single processing device. In certain embodiments, some or all of the functions of processor are implemented by hardwired circuitry.

The bridge device 106 also includes a power source (not shown) such as a non-rechargeable battery or a rechargeable battery with a battery charge connector.

The monitoring device 108 includes a processor 180 that is operative to exercise overall control and to process audio data from the bridge device 106 for identifying data content therein. The monitoring device 108 also includes a microphone 182 to receive and transduce acoustic energy from the speaker 166 of the bridge device 106 into an electrical signal for processing by processor 180. Analog conditioning circuits (not shown) can be coupled with the microphone 182 to receive the electrical signal from the speaker to perform signal conditioning functions as needed prior to analog-to-digital conversion and processing by the processor 180.

The monitoring device 108 further includes storage 184 (including both program and data storage memories) coupled with processor 180 and operative to store data as needed. In certain embodiments, storage 184 comprises a single storage device, while in others it comprises multiple storage devices. In certain embodiments, a single device implements certain functions of both processor and storage.

In certain embodiments, processor 180 comprises two or more processing devices, such as a first processing device (such as a digital signal processor) that processes audio, and a second processing device that exercises overall control over operation of the monitoring device 108. In certain embodiments, processor 180 employs a single processing device. In certain embodiments, some or all of the functions of processor are implemented by hardwired circuitry.

The monitoring device 108 also includes a power source (not shown) such as a non-rechargeable battery or a rechargeable battery with a battery charge connector.

To enable the monitoring device 108 to gather research data, namely data indicating exposure to audio content such as programs, music and advertisements, in certain embodiments, research software is installed in storage 184 to control processor 180 to gather such data and to store the data for subsequent downloading through output connection 186 and communication to a research organization. In certain embodiments, the monitoring device 108 further includes a transceiver (such as a cellular telephone transceiver—not shown) configured to communicate with and transmit the research data to the research organization.

In certain embodiments, the research software controls the processor 180 to decode ancillary codes in the transduced audio from microphone 182 using one or more of the known techniques identified herein, and then to store and/or communicate the decoded data for use as research data indicating encoded audio to which the user was exposed. In certain embodiments, the research software controls the processor 180 to extract signatures from the transduced audio from microphone 182 using one or more of the known techniques identified herein, and then to store and/or communicate the extracted signature data for use as research data to be matched with reference signatures representing known audio to detect the audio to which the user was exposed. In certain embodiments, the research software both decodes ancillary codes in the transduced audio and extracts signatures therefrom for identifying the audio to which the user was exposed. In certain embodiments, the research software controls the processor 180 to store samples of the transduced audio, either in compressed or uncompressed form for subsequent processing either to decode ancillary codes therein or to extract signatures therefrom. In certain ones of these embodiments, the compressed or uncompressed audio is communicated to a remote processor for decoding and/or signature extraction.

In certain embodiments, processor 180 adds a time and/or date stamp to the research data.

In certain embodiments, processor 180 comprises two or more processing devices, such as a first processing device (such as a digital signal processor) that processes audio data, and a second processing device that exercises overall control over operation of the monitoring device 108. In certain embodiments, processor 180 employs a single processing device. In certain embodiments, some or all of the functions of processor 180 are implemented by software, while in other embodiments, the functions of processor 180 are implemented in hardwired circuitry without the use of software.

As shown in FIG. 1, in certain embodiments, the bridge device 106 is configured as a sleeve or holster to hold the monitoring device 108. The monitoring device 108 is preferably closely fitted within the bridge device 106 such that the speaker 166 in the bridge device 106 and the microphone 182 in the monitoring device 108 are close proximity. Close positioning of the speaker 166 and microphone 182 allows a low-volume acoustic output from the bridge device 106 to be used by the monitoring device 108 to identify the audio content thereby reducing the acoustic output heard by the user, which might be an annoyance. The bridge device 106 is preferably made of rubber and plastic to provide some degree of water and shock resistance protection for the bridge device 106 and the monitoring device 108 held therein.

In certain embodiments, the bridge device 106 and the monitoring device 108 are integrated in a single device.

In certain embodiments, the wireless nodes (particularly if they follow the Bluetooth protocol) of the audio source device 102, the audio receiver device 104, and the bridge device 106 must be "paired" before the research system can be operated. In particular, the user pairs the wireless receiver node 162 of the bridge device 106 with the wireless transmitter node 122 of the audio source device 102, and also pairs the wireless transmitter node 164 of the bridge device 106 with the wireless receiver node 142 of the audio receiver device 104. Pairing can be established, e.g., by pressing one of the pairing button 168, 170 associated with one node 162, 164 on the bridge device 106 while activating a pairing function at a corresponding audio source device 102 or audio receiver device 104, and then repeating the process for the other node 162, 164 on the bridge device 106. The LED indicators 170, 172 on the bridge device 106 can indicate established pairings.

Once the wireless nodes have been paired, audio data can be sent from the audio source device 102 to the bridge device 106, and from the bridge device 106 to the audio receiver device 104. Bluetooth wireless transmitter nodes encode audio data into a selected format and pack the encoded audio data into a payload, which is the data portion of a digital data packet. The data packets are optionally encrypted, and delivered through an asynchronous connectionless link to a Bluetooth wireless receiver node. A generally reverse operation is performed at the Bluetooth wireless receiver node.

Bluetooth wireless transmitter and receiver nodes suitable for use in the bridge device 106 are commercially available, e.g., from manufacturers such as, BluePioneer, Darvon, and BluePacket Communications, built from Bluetooth microprocessors made, e.g., by Broadcom and Cambridge Silicon Radio.

In certain embodiments, the wireless transmitter node 164 and the wireless receiver node 162 of the bridge device 106 provide wireless signal bridging for stereo audio signals. In particular, if the nodes 162, 164 are Bluetooth nodes, they can follow the Advanced Audio Distribution Profile (A2DP) protocol, which is designed to transfer a two channel stereo audio stream. Thus, in accordance with various embodiments of the invention, the system 100 can be used to monitor exposure of a user to audio content as the audio content is transmitted to the user in a stereo audio stream.

Figure 5:
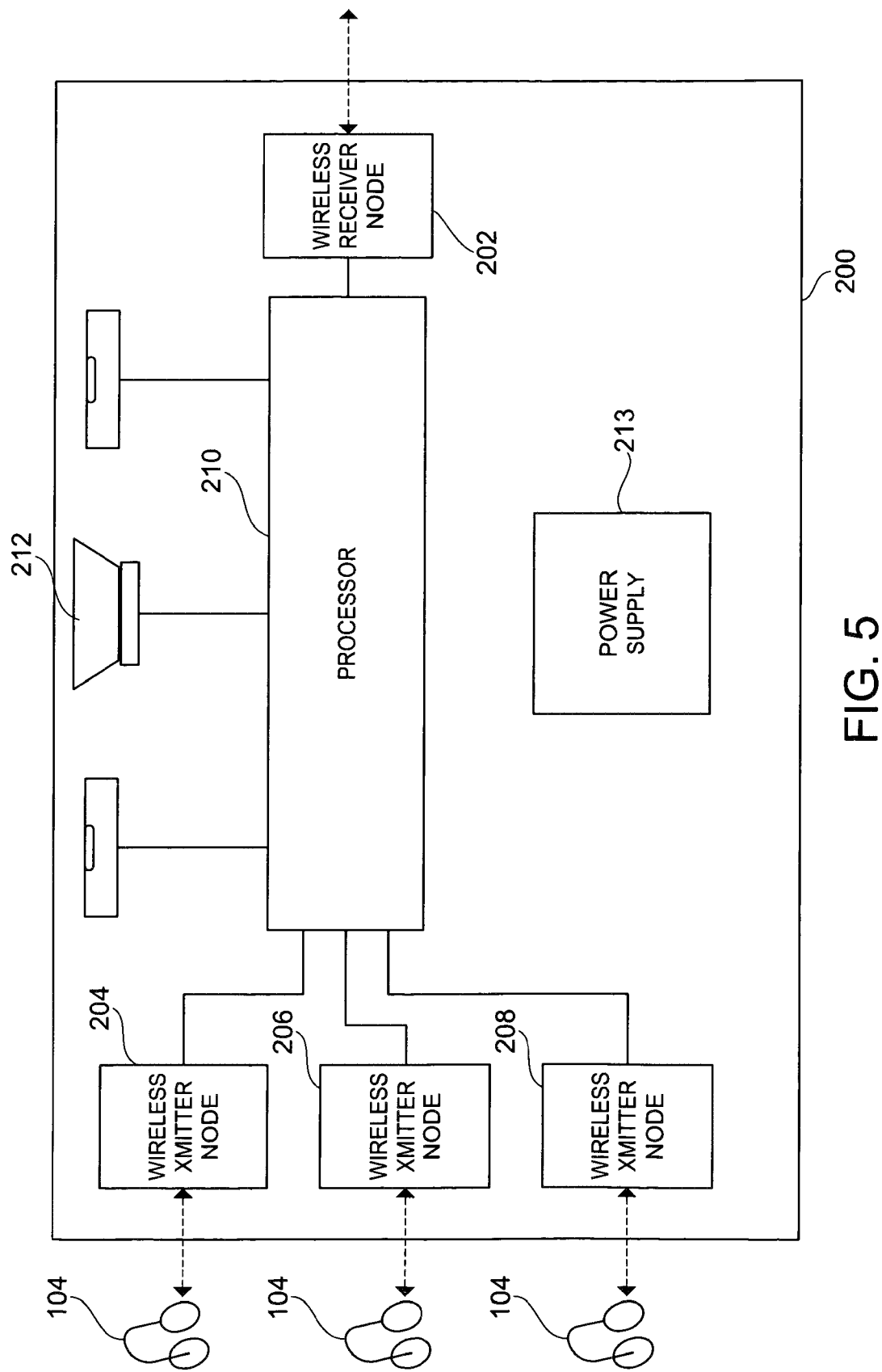
FIG. 5 is a block diagram of a bridge device in accordance with certain alternate embodiments of the invention.

As illustrated in FIG. 5, a multicasting bridge device 200 is provided in accordance with certain alternate embodiments of the invention. The bridge device 200 includes a single wireless receiver node 202 for communicating with an audio source device 102, and two or more wireless transmitter nodes 204, 206, 208, each of which can be paired with a wireless receiver node of a different audio receiver device 104. A processor 210 in the bridge device 200 sends the signal received from the wireless receiver module 202 to each of the wireless transmitter nodes 204, 206, 208. The processor 210 also transmits a demodulated audio baseband signal to a speaker 212, which transduces the signal to an acoustic output, which is received by a monitoring device 108 and used to generate data identifying the audio content as previously discussed. The device allows multiple users to wirelessly receive audio content from a single audio source device 102. This structure also allows a single bridge device 200 to be used to monitor the exposure of multiple users to audio content at a time. In one embodiment, a power supply 213 is included in the bridge device 200.

The bridge device 200 can provide wireless signal bridging for stereo audio signals. The nodes 202, 204, 206, 208 can be Bluetooth nodes following the A2DP protocol to provide stereo audio streaming, with the processor 210 acting as a stereo audio distributor. Thus, bridge device 200 can be used to distribute stereo audio signals wirelessly to a plurality of users.

Figure 6:
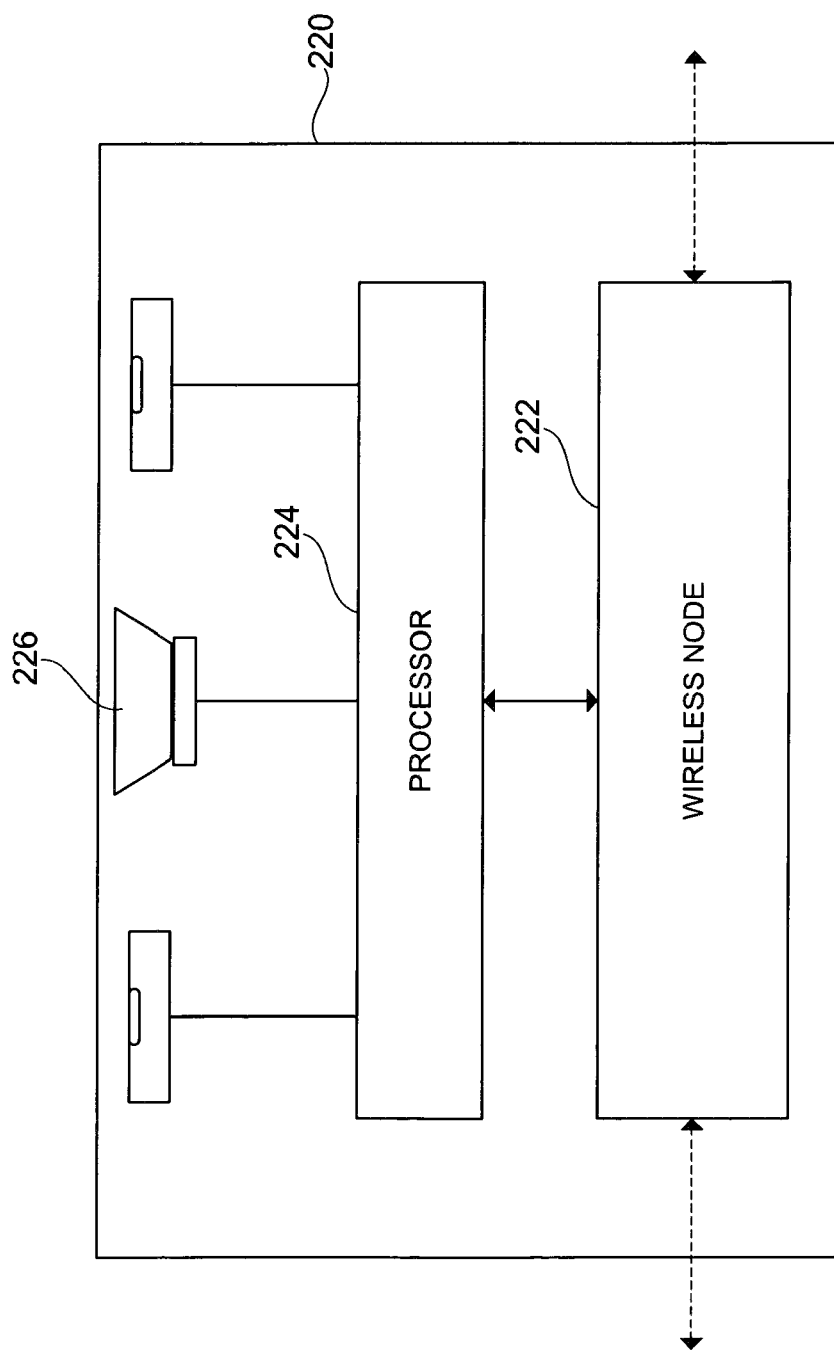
FIG. 6 is a block diagram of a bridge device in accordance with certain further alternate embodiments of the invention.

A bridge device 220 in accordance with further alternate embodiments of the invention is shown in FIG. 6. In this device, the functionality of the wireless receiver node and the wireless transmitter node of the bridge device 106 (FIG. 4) are integrated in a single integrated node 222 coupled to a processor 224. The data packets received at the integrated node 222 from the audio source device 102 are transmitted to the wireless receiver node 142 of the audio receiver device 104 without being demodulated and again modulated at the bridge device 220 before being sent. The integrated node 222 outputs a demodulated audio baseband signal that is sent to a speaker 226, which transduces the signal to an acoustic output, which is received by a monitoring device 108 and used to identify the audio content as previously discussed.

Various monitoring techniques by the monitoring device 108 for identifying audio content are possible. For example, television viewing or radio listening habits, including exposure to commercials therein, can be monitored utilizing a variety of techniques. In certain techniques, acoustic energy to which an individual is exposed is monitored to produce data that identifies or characterizes a program, song, station, channel, commercial, etc. that is being watched or listened to by the individual. Where audio media includes ancillary codes that provide such information, suitable decoding techniques are employed to detect the encoded information, such as those disclosed in U.S. Pat. Nos. 5,450,490 and 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. Pat. No. 6,871,180 to Neuhauser, et al., U.S. Pat. No. 6,862,355 to Kolessar, et al., U.S. Pat. No. 6,845,360 to Jensen, et al., U.S. Pat. No. 5,319,735 to Preuss et al., U.S. Pat. No. 5,687,191 to Lee, et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., U.S. Patent Application Publication No. 2001/0053190 to Srinivasan, U.S. Patent Application Publication No. 2003/0110485 to Lu, et al., U.S. Pat. No. 5,737,025 to Dougherty, et al., U.S. Patent Application Publication No. 2004/0170381 to Srinivasan, and WO 06/14362 to Srinivasan, et al., all of which hereby are incorporated by reference herein.

Examples of techniques for encoding ancillary codes in audio, and for reading such codes, are provided in Bender, et al., "Techniques for Data Hiding", IBM Systems Journal, Vol. 35, Nos. 3 & 4, 1996, which is incorporated herein in its entirety. Bender, et al. disclose a technique for encoding audio termed "phase encoding" in which segments of the audio are transformed to the frequency domain, e.g., by a discrete Fourier transform (DFT), so that phase data is produced for each segment. Then the phase data is modified to encode a code symbol, such as one bit. Processing of the phase encoded audio to read the code is carried out by synchronizing with the data sequence, and detecting the phase encoded data using the known values of the segment length, the DFT points and the data interval.

Bender, et al. also describe spread spectrum encoding and decoding, of which multiple embodiments are disclosed in the above-cited Aijala, et al. U.S. Pat. No. 5,579,124.

Still another audio encoding and decoding technique described by Bender, et al. is echo data hiding, in which data is embedded in a host audio signal by introducing an echo. Symbol states are represented by the values of the echo delays, and they are read by any appropriate processing that serves to evaluate the lengths and/or presence of the encoded delays.

A further technique or category of techniques, termed "amplitude modulation" is described in R. Walker, "Audio Watermarking", BBC Research and Development, 2004. In this category fall techniques that modify the envelope of the audio signal, e.g., by notching or otherwise modifying brief portions of the signal, or by subjecting the envelope to longer term modifications. Processing the audio to read the code can be achieved by detecting the transitions representing a notch or other modifications, or by accumulation or integration over a time period comparable to the duration of an encoded symbol, or by another suitable technique.

Another category of techniques identified by Walker involves transforming the audio from the time domain to some transform domain, such as a frequency domain, and then encoding by adding data or otherwise modifying the transformed audio. The domain transformation can be carried out by a Fourier, DCT, Hadamard, Wavelet or other transformation, or by digital or analog filtering. Encoding can be achieved by adding a modulated carrier or other data (such as noise, noise-like data or other symbols in the transform domain) or by modifying the transformed audio, such as by notching or altering one or more frequency bands, bins or combinations of bins, or by combining these methods. Still other related techniques modify the frequency distribution of the audio data in the transform domain to encode. Psychoacoustic masking can be employed to render the codes inaudible or to reduce their prominence. Processing to read ancillary codes in audio data encoded by techniques within this category typically involves transforming the encoded audio to the transform domain and detecting the additions or other modifications representing the codes.

A still further category of techniques identified by Walker involves modifying audio data encoded for compression (whether lossy or lossless) or other purpose, such as audio data encoded in an MP3 format or other MPEG audio format, AC-3, DTS, ATRAC, WMA, RealAudio, Ogg Vorbis, APT X100, FLAC, Shorten, Monkey's Audio, or other. Encoding involves modifications to the encoded audio data, such as modifications to coding coefficients and/or to predefined decision thresholds. Processing the audio to read the code is carried out by detecting such modifications using knowledge of predefined audio encoding parameters.

It will be appreciated that various known encoding techniques may be employed, either alone or in combination with the above-described techniques. Such known encoding techniques include, but are not limited to FSK, PSK (such as BPSK), amplitude modulation, frequency modulation and phase modulation.

In some cases a signature is extracted from transduced media data for identification by matching with reference signatures of known media data. Suitable techniques for this purpose include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties.

Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel and PCT publication WO91/11062 to Young, et al., all of which are incorporated herein by reference in their entireties.

An advantageous signature extraction technique transforms audio data within a predetermined frequency range to the frequency domain by a transform function, such as an FFT. The FFT data from an even number of frequency bands (for example, eight, ten, sixteen or thirty two frequency bands) spanning the predetermined frequency range are used two bands at a time during successive time intervals.

When each band is selected, the energy values of the FFT bins within such band and such time interval are processed to form one bit of the signature. If there are ten FFT's for each interval of the audio signal, for example, the values of all bins of such band within the first five FFT's are summed to form a value "A" and the values of all bins of such band within the last five FFT's are summed to form a value "B". In the case of a received broadcast audio signal, the value A is formed from portions of the audio signal that were broadcast prior to those used to form the value B.

To form a bit of the signature, the values A and B are compared. If B is greater than A, the bit is assigned a value "1" and if A is greater than or equal to B, the bit is assigned a value of "0". Thus, during each time interval, two bits of the signature are produced.

One advantageous technique carries out either or both of code detection and signature extraction remotely from the location where the research data is gathered, as disclosed in U.S. Patent Application Publication No. 2003/0005430 published Jan. 2, 2003 to Ronald S. Kolessar, which is assigned to the assignee of the present application and is hereby incorporated herein by reference in its entirety.

While the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. An apparatus for gathering research data indicating exposure to media, the apparatus comprising:
    means for receiving a first modulated audio signal via a wireless data connection from an audio source device using a wireless communication protocol, the first modulated audio signal associated with the media, the means for receiving to output a baseband audio signal corresponding to the first modulated audio signal;
    means for emitting the baseband audio signal;
    means for monitoring to receive the baseband audio signal from the means for emitting, and to generate research data identifying the media; and
    a housing including the means for receiving and the means for emitting, the housing having a cavity dimensioned to receive the means for monitoring, the means for emitting oriented to emit the baseband audio signal into the cavity.

2. The apparatus as described in claim 1, wherein the audio source device is a cellular phone.

3. The apparatus of claim 1, wherein the housing further includes a pairing button to cause the means for receiving to pair with the audio source device.

4. The apparatus of claim 1, wherein the wireless communication protocol includes at least one of a Bluetooth protocol, a ZigBee protocol, a wireless LAN protocol, an infrared data link, or an inductive link.

5. The apparatus of claim 1, wherein the means for monitoring includes:
a microphone to receive the baseband audio signal from the means for emitting; and
a processor to generate research data identifying media associated with the media presentation based on the received baseband audio signal.

6. The apparatus of claim 5, wherein the means for monitoring is to decode a code identifying the media or to extract an audio signature identifying the media from the baseband audio signal.

7. The apparatus of claim 1, wherein the media includes at least one of a program, music, television, radio, or an advertisement.

8. The apparatus of claim 1, wherein the wireless communication protocol is an A2DP profile.

9. An apparatus to monitor a media presentation, the apparatus comprising:
means for receiving to receive a first modulated audio signal from a media device via a wireless data connection using a wireless communication protocol, the first modulated audio signal associated with the media presentation, the means for receiving to output a baseband audio signal corresponding to the first modulated audio signal;
means for emitting carried by a housing, the means for emitting to emit the baseband audio signal for receipt by a means for monitoring;
means for transmitting to modulate the baseband audio signal to form a second modulated audio signal, the means for transmitting to transmit the second modulated audio signal to wireless headphones using the wireless communication protocol;
a first pairing button to cause the means for receiving to pair with the media device;
a second pairing button to cause the means for transmitting to pair with the wireless headphones; and
the housing defining a sleeve dimensioned to receive the means for monitoring, the means for receiving, and the means for transmitting, the means for monitoring to monitor the media presentation.

10. The apparatus as described in claim 9, wherein the media device is a cellular phone.

11. The apparatus as described in claim 9, wherein the wireless headphones are Bluetooth wireless headphones.

12. The apparatus of claim 9, wherein the first pairing button is separate from the second pairing button.

13. The apparatus of claim 9, wherein the wireless communication protocol includes at least one of a Bluetooth protocol, a ZigBee protocol, a wireless LAN protocol, an infrared data link, or an inductive link.

14. The apparatus of claim 9, further including a processor to receive the baseband audio signal from the means for receiving, the processor to transmit the baseband audio signal to the means for transmitting , the processor to transmit the baseband audio signal to the means for emitting.

15. The apparatus of claim 9, wherein the media device includes at least one of a portable media player, a personal digital assistant, a smartphone, a radio, a television, a game system, a computer, a GPS device, a DVD player, or a walkie-talkie.

16. The apparatus of claim 9, further including the means for monitoring, the means for monitoring including:
a microphone to receive the baseband audio signal from the means for emitting; and
a processor to generate research data identifying media associated with the media presentation based on the received baseband audio signal.

17. The apparatus of claim 16, wherein the means for monitoring is to decode a code identifying the media or to extract an audio signature identifying the media from the baseband audio signal.

18. The apparatus of claim 16, wherein the means for emitting is oriented to emit the baseband audio signal in the sleeve towards the microphone of the means for monitoring.

19. The apparatus of claim 9, wherein the media includes at least one of a program, music, television, radio, or an advertisement.

20. The apparatus of claim 1, wherein the means for monitoring includes means for transmitting to transmit the research data to an audience measurement entity.

* * * * *